(12) United States Patent
Lager et al.

(10) Patent No.: US 11,420,323 B2
(45) Date of Patent: Aug. 23, 2022

(54) METHOD AND CONTROL SYSTEM FOR CONTROLLING MOVEMENT SEQUENCES OF A ROBOT

(71) Applicant: ABB Schweiz AG, Baden (CH)

(72) Inventors: Anders Lager, Västerås (SE); Johnny Holmberg, Hallstahammar (SE); Magnus Wahlström, Västerås (SE)

(73) Assignee: ABB Schweiz AG, Baden (CH)

( * ) Notice: Subject to any disclaimer, the term of this patent is extended or adjusted under 35 U.S.C. 154(b) by 377 days.

(21) Appl. No.: 16/611,602

(22) PCT Filed: May 16, 2017

(86) PCT No.: PCT/EP2017/061650
§ 371 (c)(1),
(2) Date: Nov. 7, 2019

(87) PCT Pub. No.: WO2018/210404
PCT Pub. Date: Nov. 22, 2018

(65) Prior Publication Data
US 2020/0156236 A1  May 21, 2020

(51) Int. Cl.
*B25J 9/00* (2006.01)
*B25J 9/16* (2006.01)
(Continued)

(52) U.S. Cl.
CPC ............. *B25J 9/0093* (2013.01); *B25J 9/161* (2013.01); *B25J 9/163* (2013.01); *B25J 9/1605* (2013.01);
(Continued)

(58) Field of Classification Search
CPC ........ B25J 9/0093; B25J 9/1605; B25J 9/161; B25J 9/1612; B25J 9/163; B25J 9/1666;
(Continued)

(56) References Cited

U.S. PATENT DOCUMENTS 5,303,384 A * 4/1994 Rodriguez ............. B25J 9/1658
700/254
5,390,283 A 2/1995 Eshelman et al.
(Continued)

FOREIGN PATENT DOCUMENTS

CN 109822568 A * 5/2019
EP 2876066 A1 5/2015
(Continued)

OTHER PUBLICATIONS

International Preliminary Report on Patentability Application No. PCT/EP2017/061650 Completed: Nov. 19, 2019 11 Pages.
(Continued)

*Primary Examiner* — B M M Hannan
(74) *Attorney, Agent, or Firm* — Whitmyer IP Group LLC

(57) ABSTRACT

A method for controlling movement sequences of a robot, the method including predicting values of at least one parameter related to the execution of alternative movement sequences by the robot, where each movement sequence includes at least one movement segment associated with a handling location; selecting a movement sequence based on the predicted values of the at least one parameter; and executing the selected movement sequence by the robot. A control system for controlling movement sequences of a robot is also provided.

18 Claims, 8 Drawing Sheets

(51) Int. Cl.
*G05B 13/02* (2006.01)
*G06N 3/08* (2006.01)

(52) U.S. Cl.
CPC ........... *B25J 9/1612* (2013.01); *B25J 9/1666* (2013.01); *B25J 9/1687* (2013.01); *G05B 13/027* (2013.01); *G06N 3/086* (2013.01)

(58) Field of Classification Search
CPC ..... B25J 9/1687; B25J 9/1679; G05B 13/027; G05B 2219/39102; G05B 2219/40007; G05B 2219/40053; G05B 2219/45063; G06N 3/086
USPC ....... 700/243, 245, 247, 249, 250, 251, 252, 700/253
See application file for complete search history.

(56) References Cited

U.S. PATENT DOCUMENTS

| | | | |
|---|---|---|---|
| 5,719,480 A * | 2/1998 | Bock | G05B 13/027 706/14 |
| 6,275,815 B1 | 8/2001 | Schaffer et al. | |
| 6,886,003 B2 | 4/2005 | Kishi | |
| 7,076,313 B2 | 7/2006 | Welch | |
| 9,205,558 B1 * | 12/2015 | Zevenbergen | B25J 15/0052 |
| 9,687,982 B1 * | 6/2017 | Jules | B25J 9/1612 |
| 9,981,382 B1 * | 5/2018 | Strauss | B25J 9/1666 |
| 10,048,697 B1 * | 8/2018 | Theobald | G05D 1/0088 |
| 2003/0037515 A1 | 2/2003 | Herzog | |
| 2005/0113976 A1 * | 5/2005 | van der Meulen | H01L 21/67706 700/264 |
| 2006/0271240 A1 * | 11/2006 | Nihei | G05B 19/4083 700/245 |
| 2008/0301072 A1 * | 12/2008 | Nagatsuka | B25J 9/1671 706/12 |
| 2010/0241248 A1 | 9/2010 | Zhang et al. | |
| 2011/0153080 A1 | 6/2011 | Shapiro et al. | |
| 2011/0320038 A1 * | 12/2011 | Motoki | B25J 19/0008 901/46 |
| 2012/0226382 A1 * | 9/2012 | Asada | B25J 9/1605 901/47 |
| 2012/0236140 A1 * | 9/2012 | Hazeyama | B25J 9/1697 348/94 |
| 2014/0350725 A1 * | 11/2014 | LaFary | G05D 1/0274 901/50 |
| 2014/0371905 A1 | 12/2014 | Eberst et al. | |
| 2014/0372116 A1 * | 12/2014 | Smith | B25J 13/003 704/235 |
| 2016/0083199 A1 | 3/2016 | Nishizaka et al. | |
| 2016/0096273 A1 * | 4/2016 | Burns | G05B 19/401 700/259 |
| 2016/0221187 A1 * | 8/2016 | Bradski | G06V 10/60 |
| 2017/0140521 A1 * | 5/2017 | Sakaguchi | G06T 7/70 |
| 2017/0291806 A1 * | 10/2017 | Lessing | B67C 3/24 |
| 2018/0043541 A1 * | 2/2018 | Shimamura | G06T 7/70 |
| 2019/0143520 A1 * | 5/2019 | Lager | G05B 19/4182 700/228 |

FOREIGN PATENT DOCUMENTS

| | | | | |
|---|---|---|---|---|
| EP | 3556709 B1 * | 3/2020 | ............ | B66C 13/04 |
| WO | 2008071280 A1 | 6/2008 | | |

OTHER PUBLICATIONS

International Search Report & Written Opinion of the International Searching Authority Application No. PCT/EP2017/061650 Completed Date: Jan. 28, 2018; dated Feb. 1, 2018 13 Pages.
European Office Action; Application No. 17 724 790.5; dated Jun. 14, 2021; 9 Pages.
Chinese Office Action and search report; Application No. 2017800904421; dated May 25, 2022; 21 pages.

* cited by examiner

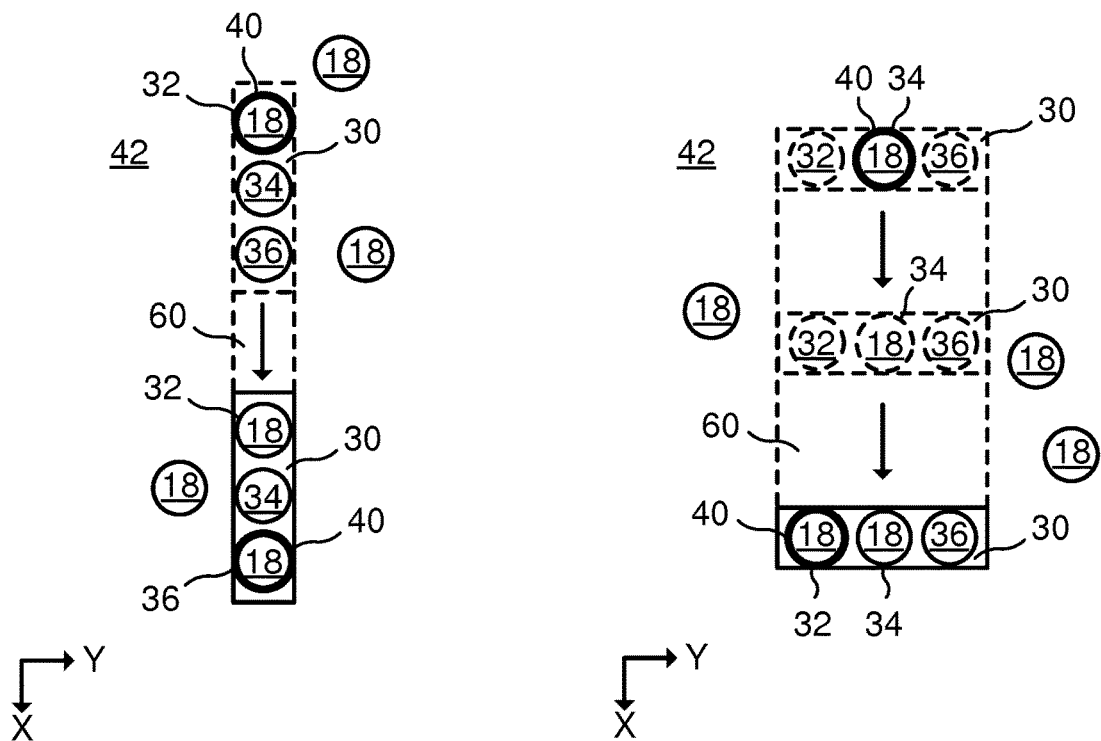
Fig. 7a
Fig. 7b
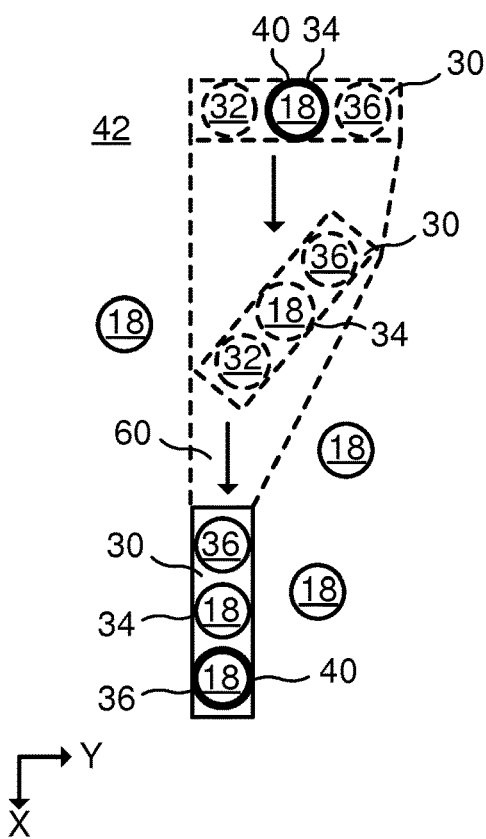
Fig. 7c
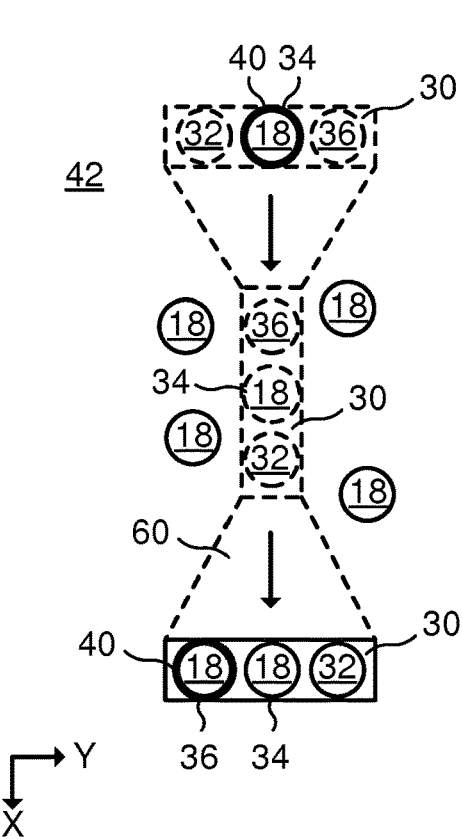
Fig. 7d

METHOD AND CONTROL SYSTEM FOR CONTROLLING MOVEMENT SEQUENCES OF A ROBOT

TECHNICAL FIELD

The present disclosure generally relates to the planning of movement sequences of robots. In particular, the present disclosure provides a method and a control system for controlling movement sequences of a robot where values of at least one parameter related to the execution of alternative movement sequences by the robot are predicted.

BACKGROUND

In a typical pick and place application, a fixed number of objects are picked one by one from a moving conveyor and placed simultaneously at a place location, e.g. on another conveyor. Multi picking robots require a tool, e.g. a gripper or a vacuum tool, with multiple activators that can be individually controlled. The use of a multi-pick-single-place sequence increases the pick rate dramatically compared to a single-pick-single-place sequence since fewer robot movements are needed to pick and place the same amount of objects.

US 2016083199 A1 discloses a robot system comprising a robot having a plurality of holders, a conveyor for conveying workpieces and a controller. The controller comprises a divided area setter for setting a plurality of divided areas on the conveyor in a width direction of the conveyor and an allocator for allocating the plurality of holders respectively to the plurality of divided areas.

US 2003037515 A1 discloses a method of filling containers with piece goods. The piece goods are fed on a feed conveyor to at least two robots arranged in a conveying direction. The robots put the piece goods into empty spaces in containers conveyed on a container conveyor. The robots are controlled to be utilized at least approximately uniformly.

US 2011153080 A1 discloses a method for robotic path planning. The method comprises receiving a robotic path for a robot and associating a plurality of zones with each location in the robotic path. The method further comprises selecting for each location one of the zones associated with the location and simulating motion of the robot over the robotic path using the locations and selected zones.

SUMMARY

One object of the present disclosure is to provide a method that improves the performance of various types of movement sequences of robots.

A further object of the present disclosure is to provide a method for controlling movement sequences of a robot that is easy to use, e.g. that requires less skill by a robot programmer.

A still further object of the present disclosure is to provide a method for controlling movement sequences of a robot that can easily be implemented in a robot system.

A still further object of the present disclosure is to provide a control system for controlling movement sequences of a robot that solves one or more of the foregoing objects.

According to one aspect, there is provided a method for controlling movement sequences of a robot, the method comprising predicting values of at least one parameter related to the execution of alternative movement sequences by the robot, where each movement sequence comprises at least one movement segment associated with a handling location; selecting a movement sequence based on the predicted values of the at least one parameter; and executing the selected movement sequence by the robot.

The method enables identification and use of an optimal, or near optimal movement sequence. Examples of parameters that may be predicted and used when selecting an optimal movement sequence may for example include time, speed, energy consumption and torque. However, any type of parameter of a movement sequence may be considered when deciding which movement sequence is optimal.

The method, which may be regarded as a self-optimized movement sequence planner, is easy to use by a robot programmer and provides a general performance increase that is hard or impossible to achieve with prior art methods. The method provides easier programming since it provides a part of the logics that a programmer needs to handle. The method is also realizable and practicable.

Throughout the present disclosure, a movement sequence may comprise only one movement segment or a plurality of movement segments. One or more single movement segments may be considered to constitute the basic "building blocks" of a movement sequence. Any movement segment of the movement sequence may be associated with a waiting time.

As used herein, a movement segment associated with a handling location may be any type of handling operation when the robot moves. Although the method is mainly described in connection with a pick and place application, the method has a wide range of alternative implementations for a robot, including cutting, guiding, processing, machining, painting, welding and sorting objects.

A movement segment may include a grip time and/or a release time (e.g. in case a gripping tool is used). Alternatively, or in addition, a movement segment may also include a retract movement and/or an extend movement of a tool position of the tool. For example, after handling an object at a handling location, such as placing an object at a place location, the robot may immediately retract the tool position to a safe, stationary position, e.g. above a conveyor. This position will then become the starting point of the next movement segment. The retraction of the tool position will contribute to avoid collisions with incoming objects, e.g. high containers, if the robot needs to wait for the next handling location. The retract movement can be skipped if the next movement segment is ready to start immediately after the previous object handling. The retract movement of the tool position may also be used for pick locations (which are also handling locations).

In relation to a pick and place cycle of the robot, the movement sequence may comprise one or more movement segments of the pick and place cycle. Alternatively, the movement sequence may comprise one or more movement segments of two different pick and place cycles or may comprise several pick and place cycles. In a pick and place application, the handling locations may be constituted by the positions of objects that shall be picked and the positions where one or more objects shall be placed.

A pick and place cycle according to the present disclosure is considered as a movement sequence comprising one or more picking movement segments followed by one or more placing movement segments. After finishing one pick and place cycle, a new pick and place cycle can be initiated.

A movement sequence may be considered optimal alone, or when combined with further consecutive movement sequences. For example, a first movement sequence and a second consecutive movement sequence may together be considered optimal although a third movement sequence alone is better (e.g. faster) than the first movement sequence, and a fourth movement sequence alone is better than the second movement sequence.

The at least one parameter may be a time for the robot to execute the respective alternative movement sequences. Alternatively, or in addition, the at least one parameter may be a required movement distance by the robot to execute the respective alternative movement sequences.

The prediction of the values of the at least one parameter may comprise the use of neural networks. The method thereby provides for an efficient implementation in a real time computer environment with machine learning techniques. Alternatively, or in addition, the selection of a movement sequence may comprise the use of a genetic algorithm.

The handling location may be a location on a moving conveyor that is expected to be within reach of the robot when the handling is expected to take place. This handling location may optionally also be constituted by a handling location that is expected to be within reach of the robot after a waiting time. The moving conveyor may be constituted by any type of moving conveyor with a handling location, such as a moving input conveyor and/or a moving output conveyor.

The handling locations may be locations on several moving input conveyors and/or on several moving output conveyors. For example, in a pick and place application, the robot may pick objects from two input conveyors and place the objects on one output conveyor. The selection of input conveyor may be based on predictions of alternative movement sequences that include alternative handling locations on both input conveyors.

Whether or not a handling location on a moving conveyor will be within reach of the robot is an expectation or a prediction that may be made for each movement segment associated with a handling location on a moving conveyor. Such prediction is exemplified in the detailed description. Reachability may for example be expected if the planned movement sequence is short, the conveyor speeds are low and the handling locations are selected from an area well within reach of the robot. Reachability may also be expected if a conveyor always is controlled to be stopped before a planned handling location moves out of reach of the robot.

A waiting time may be associated with a handling location in a movement sequence. The waiting time may start after finishing a previous movement segment and may finish when the movement segment to the handling location can be started, e.g. when the handling location has come within reach for the movement segment to be started. Thus, the waiting time may also be associated with a movement segment. In a pick and place application, waiting times may be needed for both picking movement segments and placing movement segments.

Each considered movement sequence may comprise at least one movement segment associated with a randomly selected common handling location among handling locations that are expected to be within reach of the robot when the movement segment is ready to start and optionally among handling locations that are expected to be within reach of the robot after a waiting time. Handling locations within reach of the robot may not be within reach when the movement segment execution is initiated.

In a pick and place application, a randomly selected handling location constituted by a location of a randomly selected object to be picked contributes to making the robot operate the full width of an input conveyor. As an alternative to randomly selected objects, each movement sequence may comprise at least one movement segment associated with a location of an object that is selected to make an outgoing flow from an input conveyor more uniform, for example more uniform in an input conveyor direction. In this manner, the performance of downstream robots can be improved.

Each movement sequence may comprise at least one movement segment of a pick and place cycle. In this case, the alternative movement sequences may also include different place locations (which are also handling locations) of the pick and place cycle. According to one variant, each movement sequence comprises at least two pick and place cycles.

The method may further comprise identifying collision free movement segments for alternative movement sequences. Movement sequences comprising a movement segment that will cause collisions can thereby be identified and cancelled. Examples of collisions include collisions between a tool of the robot and interfering objects, collisions between an object held by the tool and interfering objects and collisions between two robots. The movement height of a tool of the robot may be reduced for the collision free movement segments when predicting the values of the at least one parameter and/or when executing the selected movement sequence by the robot.

Each movement sequence may comprise at least two movement segments associated with at least two handling locations and the alternative movement sequences may include different sets of handling locations among a plurality of handling locations that are expected to be within reach of the robot when the movement segment is ready to start and optionally among handling locations that are expected to be within reach of the robot after a waiting time. In case a movement sequence comprises a plurality of pick and place cycles, respective first pick and place cycles of the alternative movement sequences may include different sets of the plurality of objects (handling locations) among all objects in the pick area within reach of the robot.

Different movement sequences also exist for a single set of handling locations. As an example, for a set comprising two handling locations, a first movement sequence may comprise a first movement segment associated with a first handling location and a second movement segment associated with a second handling location, and a second movement sequence may comprise a first movement segment associated with the second handling location and a second movement segment associated with the first handling location.

The robot may comprise a tool having a plurality of tool positions with which an object can be handled and the alternative movement sequences may include different orders of use of the tool positions, i.e. activation order of the tool. Examples of such tools include gripper tools having a plurality of gripping positions, vacuum tools having a plurality of suction positions and painting tools having a plurality of paint source positions.

The predictions of the values of the at least one parameter and the selection of the movement sequence may be carried out when executing a previously selected movement sequence by the robot. The method may further comprise switching to an alternative movement sequence, e.g. before finishing the execution of the previously selected movement sequence, based on the predicted values of the at least one parameter.

According to a further aspect, there is provided a control system for controlling movement sequences of a robot. The control system comprises a data processing device and a memory having a computer program stored thereon, the computer program comprising program code which, when executed by the data processing device, causes the data processing device to perform the steps of predicting values of at least one parameter related to the execution of alternative movement sequences by the robot, where each movement sequence comprises at least one movement segment associated with a handling location; selecting a movement sequence based on the predicted values of the at least one parameter; and controlling the robot to execute the selected movement sequence. The control system and at least one robot according to the present disclosure may be comprised by a robot system.

BRIEF DESCRIPTION OF THE DRAWINGS

Further details, advantages and aspects of the present disclosure will become apparent from the following embodiments taken in conjunction with the drawings, wherein:
FIG. 4b: schematically represents a top view of a further movement segment of the movement sequence in FIG. 4a;
FIG. 7a: schematically represents a top view of a further collision free movement segment;
FIG. 7b: schematically represents a top view of a further collision free movement segment;
FIG. 7c: schematically represents a top view of a further collision free movement segment;
FIG. 7d: schematically represents a top view of a further collision free movement segment.

DETAILED DESCRIPTION

Figure 1:
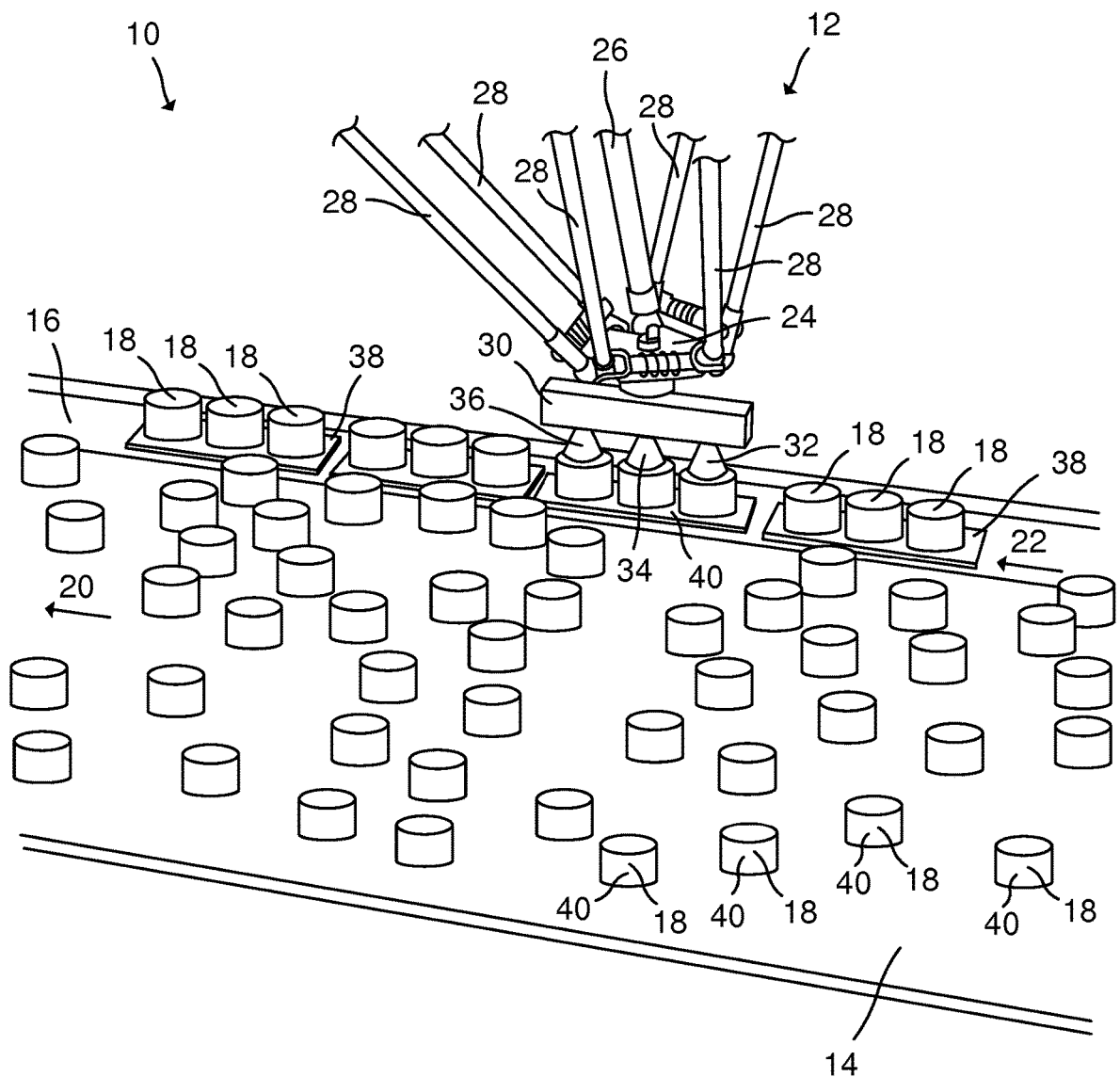
FIG. 1: schematically represents a partial perspective view of a robot system.

In the following, a method and a control system for controlling movement sequences of a robot where values of at least one parameter related to the execution of alternative movement sequences by the robot are predicted, will be described. The same reference numerals will be used to denote the same or similar structural features.

FIG. 1 schematically represents a partial perspective view of an example of a robot system 10. The robot system 10 of this example is implemented as a multi-pick-single-place application. Although the method according to the present disclosure will mainly be described in connection with a pick and place application, it is emphasized that the method can be used for a wide range of handling operations and is not limited to pick and place applications.

The robot system 10 comprises two robots 12 (only one is shown in FIG. 1), an input conveyor 14 and an output conveyor 16. The input conveyor 14 may move continuously and the output conveyor 16 may move continuously or intermittently. The input conveyor 14 and the output conveyor 16 may for example be controlled by an external system, by a control system of the robot system 10 or by a robot controller.

The input conveyor 14 is configured to convey objects 18 in an input conveyor direction 20, which in this case is parallel with the X-axis. The output conveyor 16 is configured to convey objects 18 in an output conveyor direction 22. In this example, also the output conveyor 22 is parallel with the X-axis and parallel with the input conveyor direction 20.

However, each of the input conveyor 14 and the output conveyor 16 may convey objects 18 in a different manner. A rotatable input conveyor 14 and/or a rotatable output conveyor 16 may alternatively be employed. Pick and place applications according to the present disclosure may also use a stationary input area for picking objects 18 and/or a stationary output area for placing objects 18.

In the example of FIG. 1, the output conveyor direction 22 and the input conveyor direction 20 can be referred to as a downstream direction. The objects 18 may be of various types, such as food products.

The robot 12 may for example be constituted by an industrial robot. In FIG. 1, the robot 12 is exemplified as a FlexPicker® robot. The robot 12 comprises base member 24, a telescopic arm 26 and a plurality of control arms 28.

The robot 12 further comprises a tool 30. The tool 30 comprises a plurality of tool positions 32, 34, 36. In the example of FIG. 1, the tool 30 comprises three tool positions 32, 34, 36 but the tool 30 may alternatively comprise only one tool position, only two tool positions or more than three tool positions. The tool positions 32, 34, 36 are positions on the tool 30 where one object 18 can be attached. The tool 30 may comprise one or more tool position activators (not shown) associated with each tool position 32, 34, 36. For example, if the tool 30 is a vacuum tool, a tool position activator may be constituted by a valve that opens a conduit to a suction source in order to suck an object 18 onto a respective tool position 32, 34, 36. The tool 30 is configured to spin, i.e. rotate at least in the X-Y plane.

The tool positions 32, 34, 36 of the tool 30 may further be retractable and extendable. For example, a tool position 32, 34, 36 may be extended for gripping or releasing an object 18. This is a way to avoid contact between e.g. empty (retracted) tool positions 32, 34, 36 and interfering objects 18 while gripping with another (extended) tool position 32, 34, 36.

A plurality of objects 18 are conveyed by the input conveyor 14 in a random order. The robot 12 is configured to pick three objects 18, one at a time, from the input conveyor 14 and place the three objects 18 simultaneously at one of several place locations 38, such as pallets. In this implementation, the positions of the objects 18 and the positions of the place locations 38 constitute handling locations 40. The handling of this example is thus constituted by picking and placing objects 18.

Figure 2:
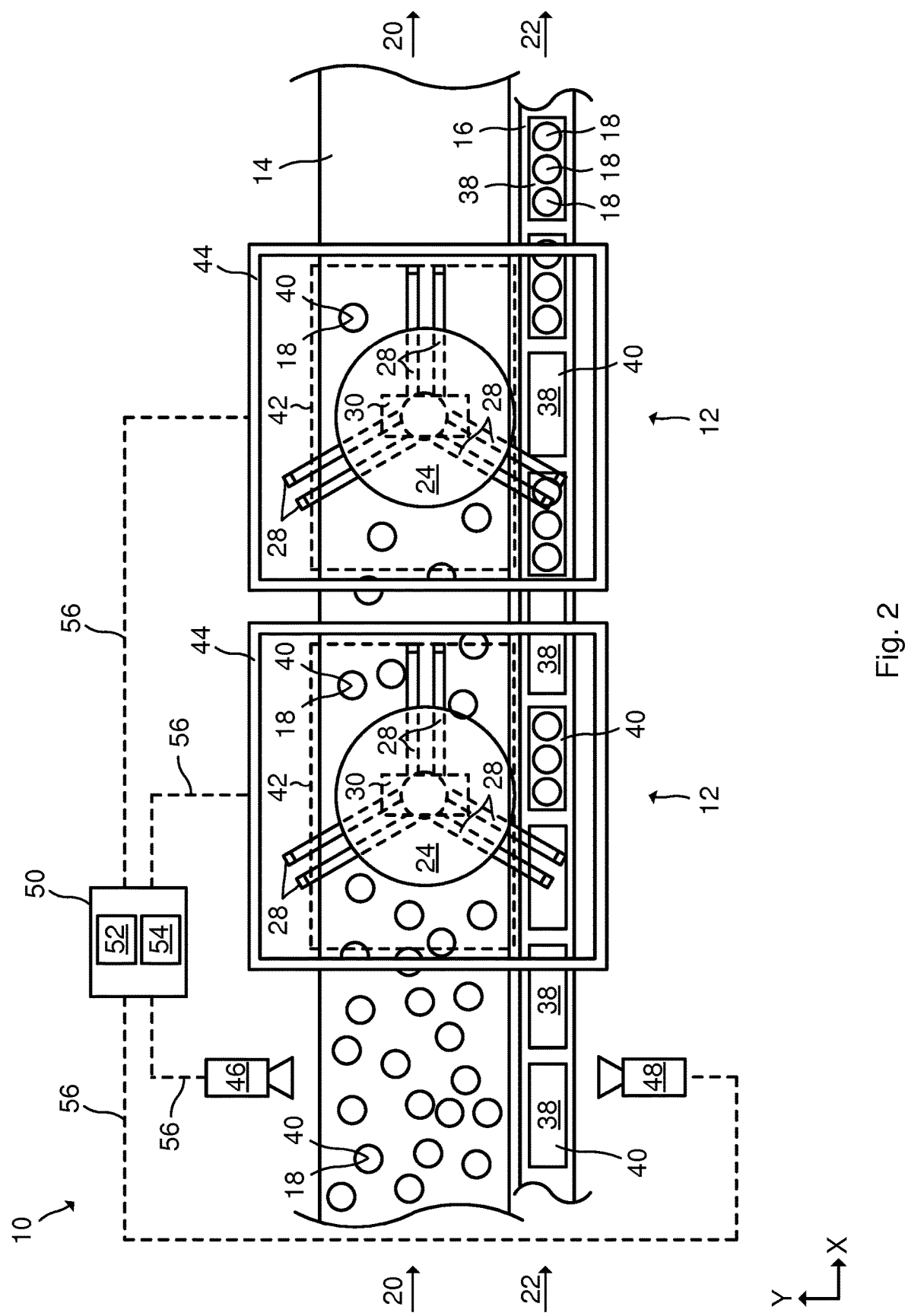
FIG. 2: schematically represents a partial top view of the robot system in FIG. 1.

FIG. 2 schematically represents a partial top view of the robot system 10 in FIG. 1. The robot system 10 of the example in FIG. 2 comprises two robots 12. Each robot 12 is arranged to pick objects 18 from a handling location 40 within a pick area 42 and place objects 18 at one of several handling locations 40 in the form of place locations 38 within a place area (not denoted). For each robot 12, the pick area 42 and the place area including the place locations 38 constitute an operating area of the robot 12. The operating area of each robot 12 may correspond to the full working range of the robot 12. A support frame 44 for each robot 12 is also shown in FIG. 2.

The robot system 10 of this example further comprises a sensor device 46, such as a camera, to localize incoming objects 18 on the input conveyor 14 and a sensor device 48, such as a camera, to localize incoming place locations 38 on the output conveyor 16.

As shown in FIG. 2, the robot system 10 further comprises a control system 50. The control system 50 is configured to control movement sequences of the two robots 12 according to the present disclosure. The control system 50 comprises a data processing device 52 (e.g. a central processing unit, CPU) and a memory 54. A computer program is stored in the memory 54. The computer program comprises program code which, when executed by the data processing device 52, causes the data processing device 52 to carry out prediction of at least one parameter related to the execution of alternative movement sequences by the robot 12, to select a movement sequence based on the predicted values of the at least one parameter, to control the robots 12 and to execute further steps according to the present disclosure. The control system 50 thus comprises a movement sequence planner according to the present disclosure. The control system 50 is in communication with each robot 12 and the sensor devices 46, 48 by means of signal lines 56.

The control system 50 in FIG. 2 is merely one possible example. The control system 50 may control more than two robots 12 or only one robot 12. As a further alternative, the robot system 10 may comprise a robot controller associated with each robot 12 and the control system 50 may be configured to coordinate the operations of the robot controllers.

Generally, in order for the robot 12 to run a pick and place application, the robot 12 has some kind of planning task that makes continuous runtime decisions regarding which objects 18 shall be picked and regarding on which place locations 38 the picked objects 18 shall be placed. The planning task will, based on the incoming objects 18 and the available place locations 38, decide a movement sequence, i.e. a movement path, to be executed by the robot 12.

The planning task may be implemented as a part of the computer program. For a movement sequence comprising picking a plurality of objects 18, the planning task not only decides which objects 18 that shall be picked. The planning task also decides in which order the objects 18 shall be picked and which tool position 32, 34, 36 that shall be used for each pick.

The pick rate of the robot 12 is highly dependent on how the planning task is made. The planning task will decide if the robot 12 will chase after outgoing objects 18 or meet with incoming objects 18. The planning task will decide if the movement segments of the robot 12 become long or short and if the tool 30 has to spin or not. With a good planning task, the pick rate can be increased and the number of robots 12 required to handle a certain pick and place task can be reduced.

A typical prior art planning task works according to the following principles:
 always pick the most downstream object 18 that the robot 12 can reach;
 always use the tool positions 32, 34, 36 in the same order; and always place the objects 18 at the most downstream place location 38.

Given a certain situation, this prior art planning task will always select a similar movement sequence for every pick and place cycle. However, there typically exists a very large amount of alternative movement sequences for a pick and place cycle and some of them are often better choices in terms of performance.

For example, picking two objects 18 with a tool 30 having two tool positions can be made in four different ways:
 1) pick the first object 18 with the first tool position and then pick the second object 18 with the second tool position,
 2) pick the first object 18 with the second tool position and then pick the second object 18 with the first tool position,
 3) pick the second object 18 with the first tool position and then pick the first object 18 with the second tool position, and
 4) pick the second object 18 with the second tool position and then pick the first object 18 with the first tool position.

Correspondingly, picking two objects 18 out of five objects 18 can be made in 40 different ways, picking two objects 18 out of 20 objects 18 can be made in 760 different ways, picking three objects 18 out of 20 objects 18 can be made in 41040 different ways, picking four objects 18 out of 20 objects 18 can be made in 2790720 different ways etc. For symmetrically shaped objects 18, e.g. objects 18 that can be picked with the tool 30 in two or more alternative angular positions with respect to the Z-axis, there exist even more alternative picking combinations. The performance of the above prior art planning task where similar movement sequences are always selected for every pick and place cycle can be significantly improved.

In order to explore the potential of an improved planning task for multi-pick-single-place cycles, the inventor made two comparative simulations. Both simulations were carried out for a situation where one robot 12 repeatedly picks three objects 18 one by one and places the objects 18 simultaneously at a place location 38. For both simulations, the inflow of objects 18 was in an ordered pattern with three columns parallel with the X-axis.

In the first simulation, the three objects 18 were picked in a standard order where the most downstream object 18 was picked and the tool positions 32, 34, 36 were used in the same order. The fly-by-height, i.e. the movement height of the tool 30 above the input conveyor 14 in the Z-axis, was set to a fixed value.

In the second simulation, the robot 12 performed the same task but the pick order of the objects 18, the orders of use of the tool positions 32, 34, 36 and the fly-by-height of the tool 30 were adjusted to minimize the movement length for each movement segment to and/or from the pick of an object 18, while maintaining margins for avoiding collisions.

As a result of the adjustments made in the second simulation, the pick rate was improved from 192 to 237 picks per minute, i.e. an increase of 25%. However, the situation for the two simulations is "rigged" since the incoming flow of objects 18 comes in an ordered pattern in order to simplify the adjustments to optimize the performance of the second simulation. The adjustments made for the second simulations are neither simple to do nor robust. If the inflow of objects 18 is randomized, the adjustments for the second simulation would no longer be optimal. It is difficult or even impossible to find general adjustments of the pick order, the order of the tool positions 32, 34, 36 and the fly-by-height that improves the performance of different pick and place situations.

Figure 3:
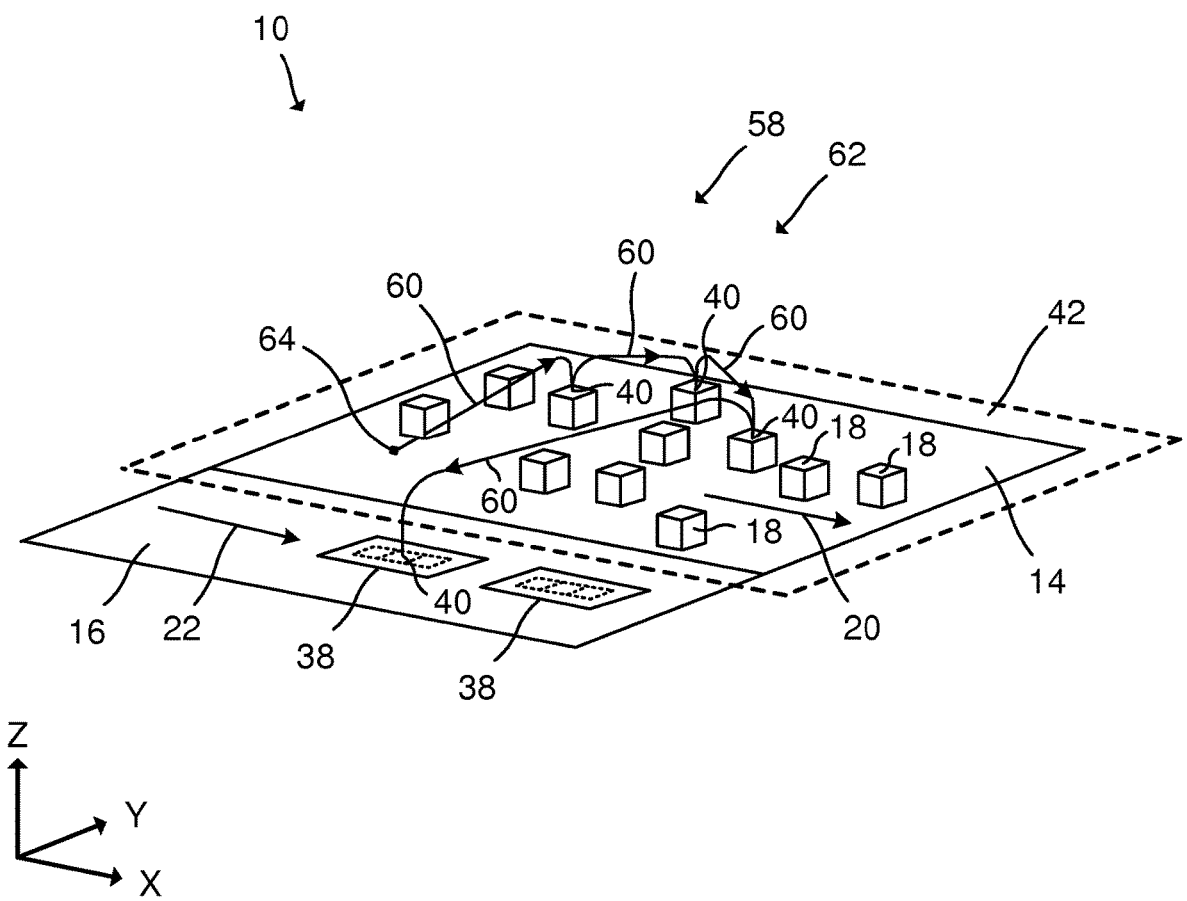
FIG. 3: schematically represents a perspective view of a movement sequence of a robot.

FIG. 3 schematically represents a perspective view of a movement sequence 58 of the robot 12. The movement sequence 58 of this example comprises four consecutive movement segments 60: three picking movement segments 60 and one placing movement segment 60. A movement sequence 58 may however comprise more or fewer movement segments 60.

A movement segment 60 may be defined by a movement from a starting position from where the robot 12 will move and a target position to which the robot 12 shall move. Most times, the movement segments 60 may also be defined as movements between two handling locations 40. In relation to a pick and place cycle 62 as in FIG. 3, the handling locations 40 typically represent locations of the objects 18 to be picked from the input conveyor 14 and locations of the place locations 38 on the output conveyor 16. The handling locations 40 also depend on which tool position 32, 34, 36 that shall be used when handling (e.g. picking and placing) an object 18.

In FIG. 3, the first movement segment 60 is constituted by the movement of the robot 12 from a starting position 64 to a first object 18 at a first handling location 40, the second movement segment 60 is constituted by the movement of the robot 12 from the first handling location 40 to a second object 18 at a second handling location 40, the third movement segment 60 is constituted by the movement of the robot 12 from the second handling location 40 to a third object 18 at a third handling location 40 and the fourth movement segment 60 is constituted by the movement of the robot 12 from the third handling location 40 to a place location 38 at a fourth handling location 40. At the place location 38, the three objects 18 picked up by the tool 30 of the robot 12 are simultaneously released.

The control system 50 according to the present disclosure can identify and use optimal or near optimal movement sequences 58 when picking and placing objects 18. The method according to the present disclosure may thus be regarded as a self-optimized movement sequence planner.

During operation of the robot 12, movement sequences 58 are repeatedly selected based on predictions of at least one parameter related to the execution of alternative movement sequences 58 by the robot 12. For each cycle, the selected movement sequence 58 is executed by the robot 12. According to one example, the at least one parameter is constituted by the time for the robot 12 to execute a movement sequence 58. A movement sequence 58 with the shortest predicted time may be selected for execution by the robot 12.

In case the at least one parameter is constituted by or comprises time, the prediction of the time may include waiting times until handling locations 40 (e.g. objects 18 on the input conveyor 14 and/or place locations 38 on the output conveyor 16) are sufficiently close to the robot 12 for a movement segment 60 to be initiated. Each waiting time may be associated with a movement segment 60. In the example of FIG. 3, the waiting time may correspond to the time it takes for an upstream object 18 (outside the pick area 42) to be conveyed by the input conveyor 14 to an intermediate position (also outside the pick area 42). When the object 18 is at this intermediate position, a movement segment 60 can be initiated such that the object 18 is conveyed into the pick area 42 at the end of the movement segment 60. Alternatively, the waiting time may correspond to the time it takes for an upstream object 18 to be conveyed by the input conveyor 14 into the pick area 42. A threshold value may be set for the waiting time such that time predictions are not carried out for movement sequences 58 having excessively long waiting times. Further unfeasible movement sequences 58 may also be identified and cancelled, for example movement sequences 58 where an object 18 is predicted to be downstream of the reach of the robot 12 before the movement segment 60 is finished.

The movement sequence 58 in FIG. 3 comprising four movement segments 60 is merely one example. In FIG. 3, the movement sequence 58 corresponds to one pick and place cycle 62. However, the movement sequences 58 may be longer or shorter and may vary over time. A movement sequence 58 may comprise only one movement segment 60, may comprise only the next few handling locations 40 (e.g. the handling locations 40 of the two or three next pick and place cycles 62) or may comprise handling of approaching handling locations 40 that are far away from the robot 12. Handling locations 40 planned for upstream robots 12 and/or downstream robots 12 may also be considered for the selection of movement sequences 58.

The predictions of the values of the at least one parameter and the selection of a movement sequence 58 may be carried out when executing a previously selected movement sequence 58 by the robot 12. The predictions of the values of the at least one parameter may be made more often to revise an already selected movement sequence 58 with updated information, e.g. newly arrived objects 18 or changed speeds of the input conveyor 14.

FIGS. 4a to 4d schematically represent top views of four movement segments 60 and object handling times of an exemplifying movement sequence 58. In the first movement segment 60 shown in FIG. 4a, the robot 12 moves from a place location 38 (handling location of a previous movement sequence), where three objects 18 are simultaneously placed, to a first handling location 40 where a first object 18 is picked by using the tool position 34 of the tool 30. In the second movement segment 60 shown in FIG. 4b, the robot 12 moves from the first handling location 40 to a second handling location 40 where a second object 18 is picked by using the tool position 32. Note that the second object 18 was outside the pick area 42 in FIG. 4a.

Figure 4B:
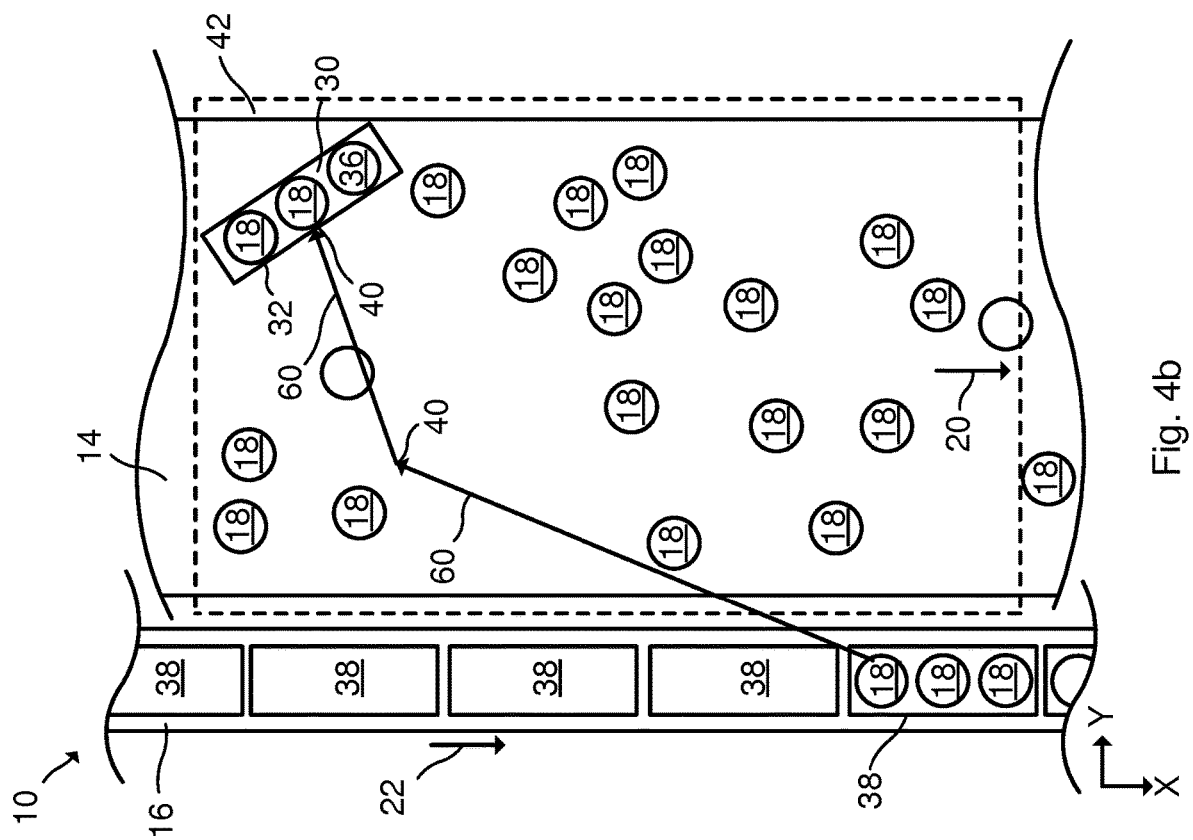
Figure 4A:
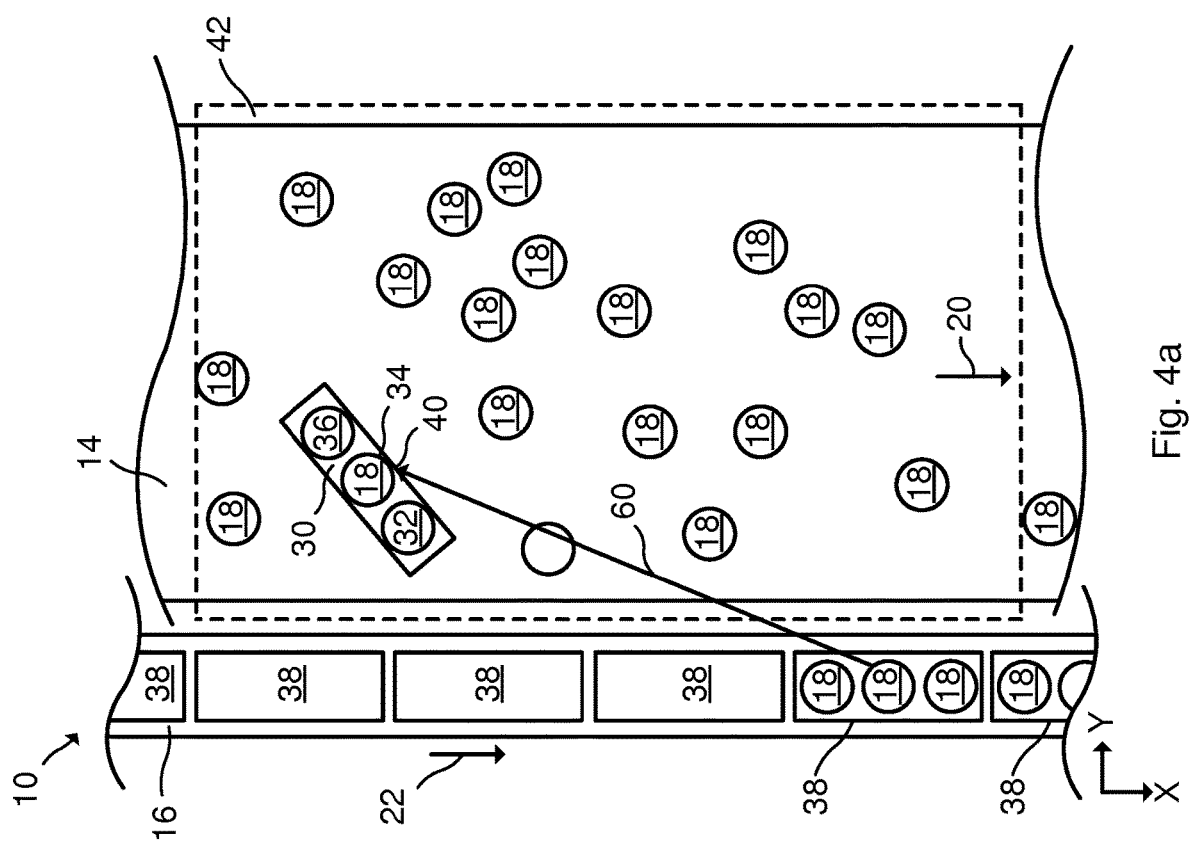
FIG. 4a: schematically represents a top view of a movement segment of a movement sequence.
Figure 4D:
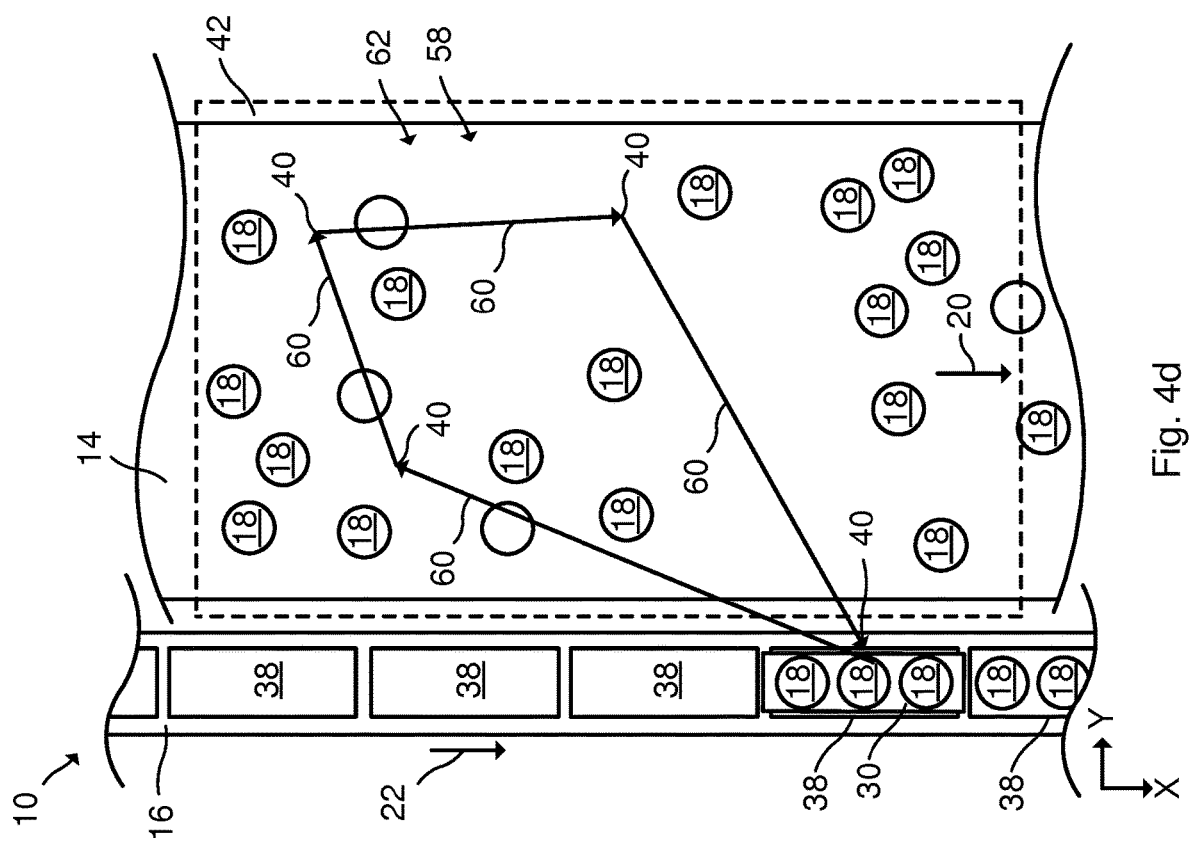
FIG. 4d: schematically represents a top view of a further movement segment of the movement sequence in FIGS. 4a, 4b and 4c.
Figure 4C:
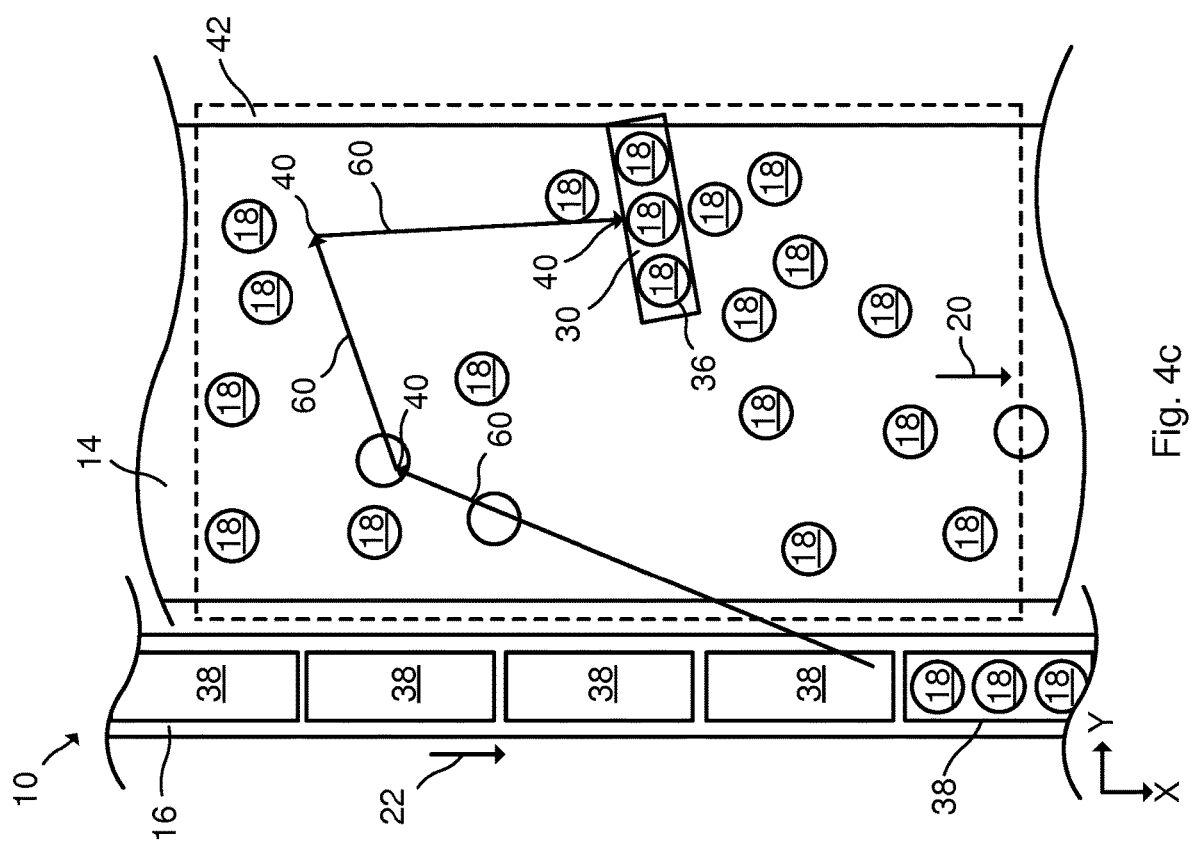
FIG. 4c: schematically represents a top view of a further movement segment of the movement sequence in FIGS. 4a and 4b.

In the third movement segment 60 shown in FIG. 4c, the robot 12 moves from the second handling location 40 to a third handling location 40 where a third object 18 is picked by using the tool position 36. In the fourth movement segment 60 shown in FIG. 4d, the robot 12 moves from the third handling location 40 to a fourth handling location 40 where all objects 18 are simultaneously placed at a place location 38.

In the movement sequence 58 in FIGS. 4a to 4d, the orders of use of the tool positions 32, 34, 36 is tool position 34, tool position 32 and tool position 36. An alternative movement sequence 58 can be formed by handling the same set of objects 18 as in FIGS. 4a to 4d but with a different order of use of the tool positions 32, 34 36.

Figure 5:
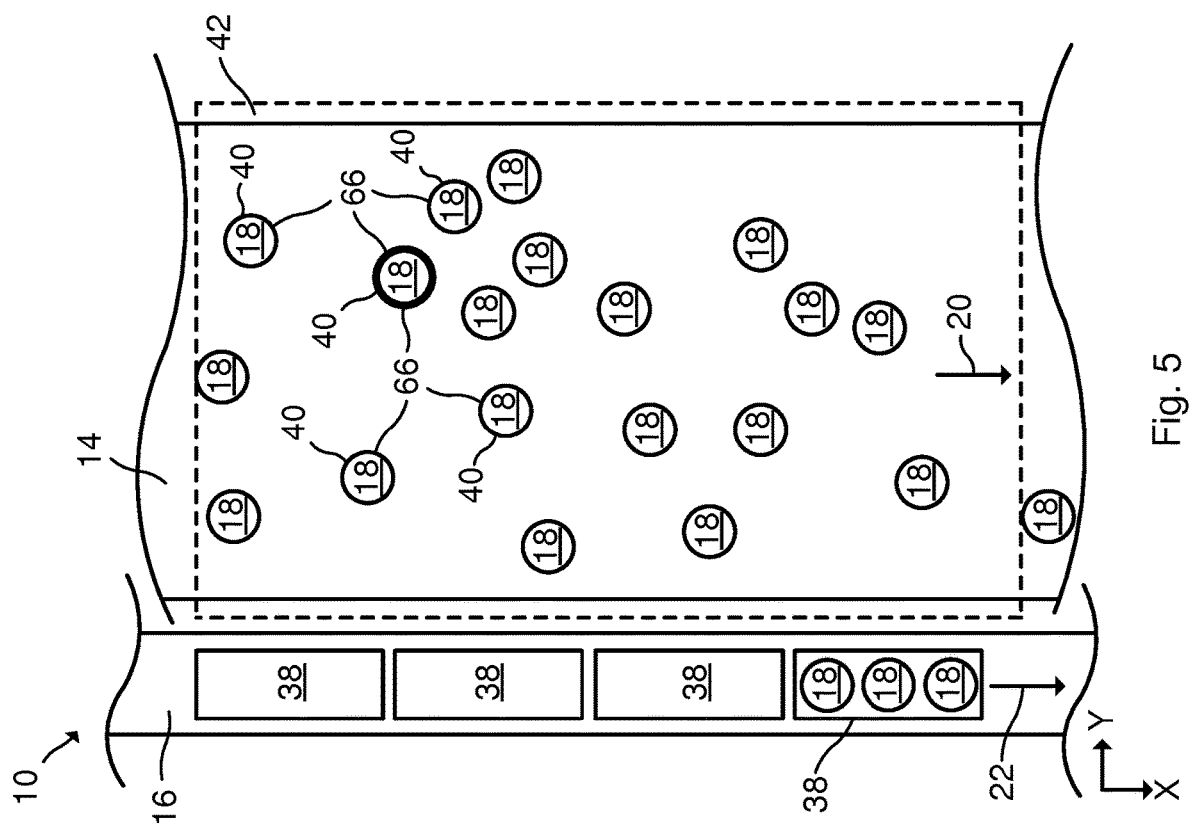
FIG. 5: schematically represents a top view of different sets of handling locations among a plurality of handling locations within reach of the robot.

FIG. 5 schematically represents a top view of different sets 66 of handling locations 40 among a plurality of handling locations 40 within reach of the robot 12. In the example of FIG. 5, each set 66 comprises two unique handling locations 40 and a common handling location 40 (marked in bold) that has been randomly selected. The randomly selected handling location 40 must be handled when executing a selected movement sequence 58.

For each planning cycle, a common handling location 40 may be randomly selected among all reachable handling locations 40 of the robot 12 (and possibly handling locations 40 that will be reachable if waiting times are included in the movement sequence 58). Any movement sequence 58 comprising a movement segment 60 that is associated with the randomly selected handling location 40 may thus be a candidate for the prediction of values of the at least one parameter and for execution by the robot 12. Prior to making the next prediction, a further handling location 40 may be randomly selected. A random selection of a handling location 40 may be made for each cycle or less frequent. In case no handling location 40 is randomly selected, all alternative sets 66 of handling locations 40 to be handled in the movement sequence 58 do not need to have a handling location 40 in common.

Figure 6:
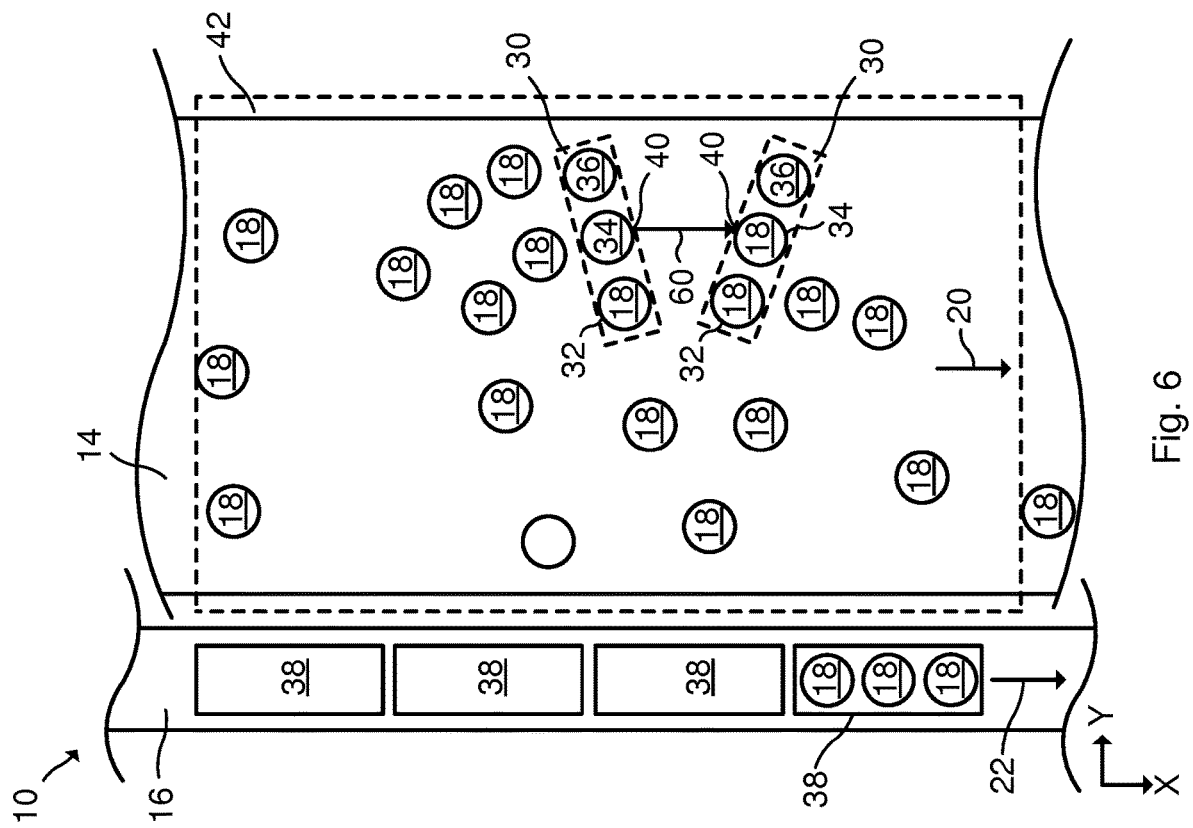
FIG. 6: schematically represents a top view of a collision free movement segment.

FIG. 6 schematically represents a top view of a collision free movement segment 60. The example layout of the objects 18 on the input conveyor 14 is the same as in FIGS. 4a and 5.

As illustrated in FIG. 6, the robot 12 can be moved from a first handling location 40, where a first object 18 is picked by the tool position 32 of the tool 30, to a second handling location 40, where a second object 18 is picked by the tool position 34 of the tool 30, along the collision free movement segment 60. As also illustrated in FIG. 6, a slight rotation of the tool 30 in the X-Y plane may be required to avoid interference with other objects 18. The movement height of the tool 30 above the input conveyor 14 (in the Z-direction) may be reduced when predicting values of the at least one parameter related to the execution of alternative movement sequences 58 comprising the movement segment 60 in FIG. 6 and/or when executing a selected movement sequence 58 comprising the movement segment 60 in FIG. 6. According to one variant, movement sequences 58 comprising one or more collision free movement segments 60 may be prioritized over movement sequences 58 not comprising any collision free movement segment 60 when selecting a movement sequence 58 for execution.

FIGS. 7a to 7d schematically represent top views of further examples of collision free movement segments 60. In the movement segment 60 in FIG. 7a, the tool 30 moves straight in the X-direction while being aligned with the X-direction and without rotation in the X-Y plane from a first handling location 40 where a first object 18 (marked in bold) is picked by the tool position 32 to a second handling location 40 where a second object 18 (marked in bold) is picked by the tool position 36. In the movement segment 60 in FIG. 7b, the tool 30 moves straight in the X-direction while being aligned with the Y-direction and without rotation in the X-Y plane from a first handling location 40 where a first object 18 is picked by the tool position 34 to a second handling location 40 where a second object 18 is picked by the tool position 32.

In the movement segment 60 in FIG. 7c, the tool 30 is rotated 90° in the X-Y plane while moving from a first handling location 40 where a first object 18 is picked by the tool position 34 with the tool 30 aligned with the Y-direction to a second handling location 40 where a second object 18 is picked by the tool position 36 with the tool 30 aligned with the X-direction. In the movement segment 60 in FIG. 7d, the tool 30 is rotated 180° in the X-Y plane while moving from a first handling location 40 where a first object 18 is picked by the tool position 34 with the tool 30 aligned in the Y-direction to a second handling location 40 where a second object 18 is picked by the tool position 36 with the tool 30 again aligned with the Y-direction. At an intermediate position of the movement segment 60 in FIG. 7d between the first handling location 40 and the second handling location 40, the tool 30 is aligned with the X-direction and thereby avoids interference with adjacent objects 18.

Figure 8A:
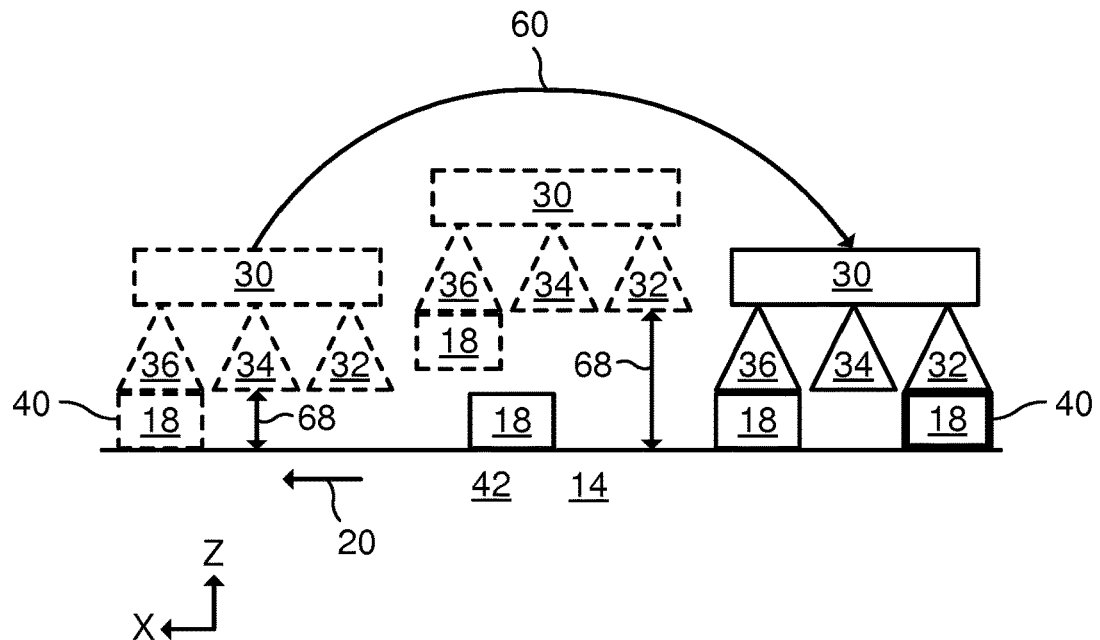
FIG. 8a: schematically represents a side view of a non-collision free movement segment.

FIG. 8a schematically represents a side view of a non-collision free movement segment 60. In order to move from a first handling location 40, where a first object 18 is picked by the tool position 36, to a second handling location 40, where an object 18 (marked in bold) is picked by the tool position 32, the movement height 68 of the tool 30 in the Z-axis above the input conveyor 14 needs to be increased in order to avoid collision with an interfering object 18 on the input conveyor 14 (in this case, a collision between an object 18 held by the tool 30 and the interfering object 18 on the input conveyor 14).

Figure 8B:
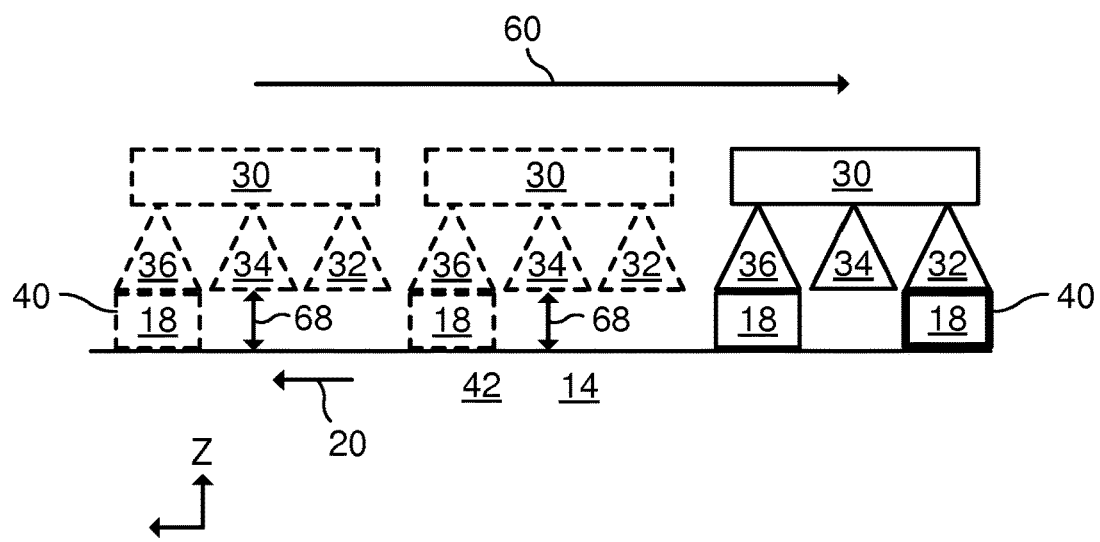
FIG. 8b: schematically represents a side view of a collision free movement segment.

FIG. 8b schematically represents a side view of a collision free movement segment 60. Since no interfering object 18 is present for this movement segment 60, the tool 30 can be moved from a first handling location 40, where a first object 18 is picked by the tool position 36, to a second handling location 40, where an object 18 (marked in bold) is picked by the tool position 32, while maintaining substantially the same movement height 68 of the tool 30 above the input conveyor 14. The movement height 68 may be only slightly increased to establish a safety margin to the input conveyor 14.

In the following, predictions of times related to the execution of alternative movement sequences 58 will be described mainly in connection with the example in FIG. 3. However, values of parameters other than the time may be predicted and used as a basis for the selection of a movement sequence 58 and the movement sequence 58 does not need to be related to a pick and place cycle 62. For a movement sequence 58 comprising one or more movement segments 60, a time $T_{mseq}$ can be predicted that indicates how long time it will take to perform the movement sequence 58. The time $T_{mseq}$ may for example depend on the following parameters:

- The initial locations of the handling locations 40 (e.g. the initial locations of the objects 18 on the input conveyor 14 and the initial locations of the place locations 38 on the output conveyor 16);
- The performance of the robot 12 (e.g. acceleration and speed);
- The speed of the input conveyor 14;
- The speed of the output conveyor 16;
- The possible waiting times until handling locations 40 are within reach of the robot 12 (e.g. waiting times until objects 18 on the input conveyor 14 is within the pick area 42 and/or waiting times until place locations 38 are within the place area of the robot 12);
- The required movement height 68 of the tool 30 (i.e. whether the movement height 68 can be reduced for collision free movement segments 60);
- The picking time and the release time of the tool 30 (e.g. gripping time or suction time); and
- The pay load of the tool 30 (including accumulated objects 18).

The calculations to make the time predictions can be made in various ways. However, the calculations need to be fast enough to guide one or more robots 12 in real time. The present disclosure provides for the use of a neural network to make the time predictions. The neural network may be trained with data collected from previously executed movements of the robot 12 in a real robot system 10 and/or from simulations. The training of the neural network may be performed on the robot system 10 or offline, e.g. with a cloud based service.

It may be sufficient if the neural network is used to predict times $T_{mseg}$ related to single movement segments 60. These predictions of the times $T_{mseg}$ can be combined to predict times $t_{mseg}$ of a movement sequence 58 (when the movement sequence 58 comprises more than one movement segment 60). Prototyping has shown that a neural network can be applied in a way that enables accurate time predictions with very limited CPU load on the control system 50.

The neural network can be trained to predict the time $T_{mseg}$ it takes for the robot 12 to perform a movement segment 60 from a starting position to a target position. The predictions may for example be based on one or more of the following parameters:

Starting position of the robot 12, s [$s_x$, $s_y$, $s_z$] (mm);
Starting orientation of the robot 12, θ [$θ_α$, $θ_β$, $θ_γ$] (rad);
Starting conveyor, $c_s$ (0, 1, 2, ... );
Target position of the robot 12, t [$t_x$, $t_y$, $t_z$] (mm);
Target orientation of the robot 12, φ[$φ_α$, $φ_β$, $φ_ω$] (rad);
Target conveyor, $c_t$ (0, 1, 2, ... );
Movement speed of the starting conveyor $v_s$ (mm/s);
Movement speed of the target conveyor $v_t$ (mm/s);
Movement heights 68 of the tool 30, $h_1$, $h_2$ (mm);
Movement zones of the robot 12, $z_1$, $z_2$ (mm);
Pay load of the tool 30, m (kg);
Picking time of the tool 30, g (s).

The value of the starting conveyor $c_s$ indicates on which conveyor the starting position of a movement segment 60 is located. Correspondingly, the value of the target conveyor $c_t$ indicates on which conveyor the target position of a movement segment 60 is located.

The starting position s and the target position t of the movement segment 60 may be given in a robot fixed frame, e.g. the base coordinate system of the robot 12. If the starting position s and/or the target position t of the movement segment 60 is moved during execution of the movement segment 60, the coordinates of these positions may correspond to the time when the robot 12 is starting the movement. The starting position s and the target position t of the robot 12 will depend on the selection of the tool position 32, 34, 36 that shall be used. For this reason, the tool position 32, 34, 36 may not be needed as an explicit parameter for predicting the time $T_{mseg}$ for a movement segment 60.

The training of the target function $T_{mseg}$ (s, θ, $c_s$, t, φ, $c_t$, m, h, ... ) is done by performing large amounts of movement segments 60 (simulated or real). For each movement segment 60, the time and the parameter values are recorded. From the recorded data, the neural network is trained to predict the time $T_{mseg}$ for single movement segments 60.

The $T_{mseg}$ for a movement sequence 58 can be calculated as the sum of the predicted times $T^k_{mseg}$ of the movement segments 60 comprised in the movement sequence 58 and related waiting times w as follows:

$$\Sigma_{i=1}^{n}(T_{mseg}^{i}+w^{i}) \tag{1}$$

The waiting time $w^i$ is the time that the robot 12 has to wait for an object 18 to come within reach for starting the movement segment 60.

The first starting position $s^1$ and the first target position $t^1$ are checked for reachability. The movement sequence 58 is cancelled if $s^1$ or $t^1$ is not within reach. The time prediction of the first movement segment 60 becomes:

$$T_{mseg}^{1}=f(s^1,θ^1,c_s^1,t^1,Φ^1,c_t^1,m^1,h^1,...) \tag{2}$$

If the selection of a movement sequence 58 shall be done while the robot 12 is moving, the ongoing movement segment 60 can be handled as the first movement segment 60, by using previously recorded input parameters to be used for the prediction of $T^1_{mseg}$ (with $w^1$=0).

The starting position $s^k$ of the $k^{th}$ movement segment 60, where k>1, may be the same position as the previous target position. The starting position $s^k$ may also be adjusted for movement of the target conveyor (either input conveyor 14 or output conveyor 16) during the previous movement time as follows:

$$s^k=t^{k-1}+M_t^{k-1}*T_{mseg}^{k-1}*v_t^{k-1} \tag{3}$$

where $M^{k-1}_t$ is a unit vector in the movement direction of the previous target conveyor (either output conveyor direction 22 or input conveyor direction 20). In this example, a linear conveyor with constant speed is assumed. The starting position $s^k$ is checked for reachability. The movement sequence 58 is cancelled if the starting position $s^k$ is not within reach.

A preliminary target position $t^k_{prel}$ of the $k^{th}$ movement segment 60 is calculated from previous movement times $T^i_{mseg}$, previous waiting times $w^i$ and the speed of the target conveyor as follows:

$$t_{prel}^{k}=t_0^k+v_t^k*M_t^k*\Sigma_{i=1}^{k-1}(T_{mseg}^{i}+w^{i}) \tag{4}$$

where $t^k_0$ is a position on the target conveyor corresponding to the preliminary target position $t^k_{prel}$ at the start of the movement sequence 58.

A preliminary waiting time may be set as $w^k_{prel}$=0. The preliminary target position $t^k_{prel}$ is checked for reachability. The movement sequence 58 is cancelled if the preliminary target position $t^k_{prel}$ has passed beyond reach. If the position on the target conveyor corresponding to the preliminary target position $t^k_{prel}$ is not yet within reach of the robot 12, a conveyor distance preach is added to have the position on the target conveyor corresponding to the preliminary target position t just within reach for starting the movement segment 60. The target position $t^k$ may thus be defined as follows:

$$t^k=t^k_{prel}+D_{reach}*M_t^k \tag{5}$$

The waiting time $w^k$ becomes:

$$w^k=\frac{D_{reach}}{v_t^k} \tag{6}$$

The time prediction of the $k^{th}$ movement segment 60 by the robot 12 becomes:

$$T_{mseg}^{1}=f(s^k,θ^k,c_s^k,t^k,Φ^k,c_t^k,m^k,h^k,...) \tag{7}$$

The final position of the last ($n^{th}$) movement segment 60 is calculated as follows:

$$t^n=t^{n-1}+M_t^n*T_{mseg}^{n}*v_n^t \tag{8}$$

The final position $t^n$ is the position where the robot 12 will handle the last handling location 40. The final position $t^n$ is checked for reachability. The movement sequence 58 is cancelled if the final position to is not within reach.

The time $T_{mseg}$ of a movement sequence 58 can be summarized as:

$$T_{mseg}=\Sigma_{i=1}^{n}(T_{mseg}^{i}+w^{i}) \tag{9}$$

as:

In the following, optimization of movement sequences 58 will be described mainly in connection with the example in FIG. 3. In this example, the optimization target is to select a movement sequence 58 with minimized time $T_{mseq}$. However, selection of a movement sequence 58 according to the present disclosure may alternatively be made based on predicted values of parameters other than, or in addition to, the time.

The optimization problem can be solved in different ways, e.g. by evaluating all possible movement sequences 58. The total number of alternative movement sequences 58 may however become very large. For example, if the robot 12 shall execute n movement segments 60 to pick n objects 18 out of m reachable objects 18 with a tool 30 having n tool positions 32, 34, 36, the number of possible alternative movement sequences 58 will be:

$$\frac{m! * n!}{(m-n)!} \quad (10)$$

The number of possible alternative movement sequences 58 increases rapidly when m and n increases. Predicting all alternative movement sequences 58 in real time may not be possible. In this case, a sufficiently good movement sequence 58 may be found by using a genetic algorithm, where a smaller population of movement sequences 58 is used to generate new generations of movement sequences 58 until a sufficiently good movement sequence 58 is found.

The inventor has developed a prototype implementation of the method based on neural networks in a simulated environment (RobotStudio®). A neural network was created and trained offline in MatLab® and thereafter exported to the simulated environment. Data from 300 000 different movement segments 60 were collected from a simulated robot 12 running a multi pick application during about 20 hours. In every pick and place cycle 62, the robot 12 picked three objects 18 one by one from the input conveyor 14 and placed all three objects 18 simultaneously at a place location 38 on the output conveyor 16. The target positions were randomized in the horizontal plane (X-Y plane).

Two movement heights 68 were used randomly, one to fly over intermediate objects 18 and one to fly low. The following parameters were recorded for each movement segment 60: $T''_{mseg}$, $s''_x$, $s''_y$, $s''_z$, $\theta''_\omega$, $t''_x$, $t''_y$, $t''_z$, $\phi''_\omega$, $c''_s$, $c''_t$, $h''_1$, and $h''_2$. In this multi picking scenario, there was no need to record other parameters since these were constant, e.g. the speeds of the input conveyor 14 and the output conveyor 16.

A neural network with one hidden layer of 120 neurons was trained with 70% of the recorded data to estimate times $T''_{mseg}$ for the movement segments 60. The remaining 30% of the data was used for validation and testing. The estimation accuracy was 96%, where 100% is a perfect fit and 0% means no correlation at all between the time of a movement segment 60 and the parameter selection. The estimation error was typically ±5% and sometimes up to ±10%.

In a first simulation, the robot 12 ran a similar multi pick application that was used in the training phase. However, every movement sequence 58 (three movement segments 60 for picking objects 18 and one movement segment 60 for placing the objects 18) was now planned. The planning included selection of objects 18 and selection of tool position 32, 34, 36 for each of the three picking movement segments 60 of the movement sequence 58. To make sure the robot 12 would work over the entire width of the input conveyor 14, one of the three objects 18 was selected randomly for every movement sequence 58. However, the planner had the freedom to decide in which picking movement segment 60 and with which tool position 32, 34, 36 the random object 18 was picked.

During the planning, the trained neural network was used to predict the time $T_{mseq}$ for all alternative movement sequences 58. The movement sequence 58 with the shortest time $T_{mseq}$ was selected for execution by the robot 12. Each planning was made after the third picking movement segment 60 and included the ongoing placing movement segment 60, the first picking movement segment 60, the second picking movement segment 60, the third picking movement segment 60 and the next placing movement segment 60.

In a second simulation, the robot 12 performed the same job but with the prior art approach, i.e. downstream objects 18 were prioritized and the tool positions 32, 34, 36 were always used in the same order.

The comparison between the first simulation and the second simulation showed that the pick rate was increased with 11% for the first simulation, from a pick rate of 186 picks per minute for the second simulation to a pick rate of 207 picks per minute for the first simulation. The increased pick rate was a result of the more efficient selection of objects 18 and order of use of the tool positions 32, 34, 36 by the movement sequence planner. An additional performance increase is expected if the movement height 68 of the robot 12 is optimized to fly lower for collision free movement segments 60.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A Method for controlling movement sequences of a robot, the method comprising:
   predicting values of at least one parameter related to an execution of alternative movement sequences by the robot, where each movement sequence includes at least one movement segment associated with a handling location;
   selecting a movement sequence based on the predicted values of the at least one parameter; and
   executing the selected movement sequence by the robot;
   wherein each movement sequence includes at least two movement segments associated with at least two handling locations and wherein the alternative movement sequences include different sets of handling locations among a plurality of handling locations that are expected to be within reach of the robot when the movement segment is ready to start and optionally among handling locations that are expected to be within reach of the robot after a waiting time.

2. The method according to claim 1, wherein the at least one parameter is a time for the robot to execute the respective alternative movement sequences.

3. The method according to claim 2, wherein the at least one parameter is a required movement distance by the robot to execute the respective alternative movement sequences.

4. The method according to claim 2, wherein the prediction of the values of the at least one parameter includes a use of neural networks.

5. The method according to claim 2, wherein the selection of a movement sequence includes a use of a genetic algorithm.

6. The method according to claim 2, wherein the handling location is a location on a moving conveyor that is expected to be within reach of the robot when the movement segment is ready to start and optionally that is expected to be within reach of the robot after a waiting time.

7. The method according to claim 1, wherein the at least one parameter is a required movement distance by the robot to execute the respective alternative movement sequences.

8. The method according to claim 1, wherein the prediction of the values of the at least one parameter includes a use of neural networks.

9. The method according to claim 1, wherein the selection of a movement sequence includes a use of a genetic algorithm.

10. The method according to claim 1, wherein the handling location is a location on a moving conveyor that is expected to be within reach of the robot when the movement segment is ready to start and optionally that is expected to be within reach of the robot after a waiting time.

11. The method according to claim 1, wherein each movement sequence includes at least one movement segment associated with a randomly selected common handling location among handling locations that are expected to be within reach of the robot when the movement segment is ready to start and optionally among handling locations that are expected to be within reach of the robot after a waiting time.

12. The method according to claim 1, wherein each movement sequence includes at least one movement segment of a pick and place cycle.

13. The method according to claim 1, further comprising identifying collision free movement segments for alternative movement sequences.

14. The method according to claim 13, wherein a movement height of a tool of the robot above a conveyor is reduced for the collision free movement segments when predicting the values of the at least one parameter and/or when executing the selected movement sequence by the robot.

15. The method according to claim 1, wherein the robot includes a tool having a plurality of tool positions with which an object can be handled and wherein the alternative movement sequences include different orders of use of the tool positions.

16. The method according to claim 1, wherein the predictions of the values of the at least one parameter and the selection of the movement sequence are carried out when executing a previously selected movement sequence by the robot.

17. The method according to claim 16, further comprising switching to an alternative movement sequence based on the predicted values of the at least one parameter.

18. A control system for controlling movement sequences of a robot, the control system comprising a data processing device and a memory having a computer program stored thereon, the computer program having a program code which, when executed by the data processing device, causes the data processing device to perform the steps of:
- predicting values of at least one parameter related to an execution of alternative movement sequences by the robot, where each movement sequence includes at least one movement segment associated with a handling location;
- selecting a movement sequence based on the predicted values of the at least one parameter; and
- controlling the robot to execute the selected movement sequence;
- wherein each movement sequence includes at least two movement segments associated with at least two handling locations and wherein the alternative movement sequences include different sets of handling locations among a plurality of handling locations that are expected to be within reach of the robot when the movement segment is ready to start and optionally among handling locations that are expected to be within reach of the robot after a waiting time.

* * * * *